United States Patent [19]
Frisbee, Jr.

[11] 3,836,966
[45] Sept. 17, 1974

[54] DUAL MODE RADAR SYSTEM
[75] Inventor: Belmont Frisbee, Jr., Ridgecrest, Calif.
[73] Assignee: The United States of America as represented by the Secretary of the Navy, Washington, D.C.
[22] Filed: Oct. 5, 1972
[21] Appl. No.: 298,096

[52] U.S. Cl. ............... 343/14, 343/5 R, 343/6 R, 343/7 TA, 343/12 A
[51] Int. Cl. ............... G01s 9/04, G01s 9/24
[58] Field of Search ...... 343/6 R, 7 TA, 5 W, 12 A, 343/5 R, 7 A, 12 R, 14

[56] References Cited
UNITED STATES PATENTS
3,185,984 5/1965 Child et al. ............... 343/12 A
3,277,467 10/1966 Barney ............... 343/7 TA
3,657,719 4/1972 Bollard et al. ............... 343/7 TA
3,706,988 12/1972 Bayle et al. ............... 343/6 R

*Primary Examiner*—Maynard R. Wilbur
*Assistant Examiner*—G. E. Montone
*Attorney, Agent, or Firm*—R. S. Sciascia; Roy Miller; R. W. Adams

[57] ABSTRACT

A dual mode electronic system combining the seeker radar system and the altimeter radar system of a missile. The present invention includes a switch for selecting the operative mode from either of the two modes incorporated (seeker radar system or altimeter radar system). The components of one system which duplicate the components of the other system are eliminated since the duplicated components will be shared.

1 Claim, 1 Drawing Figure

PATENTED SEP 17 1974 3,836,966
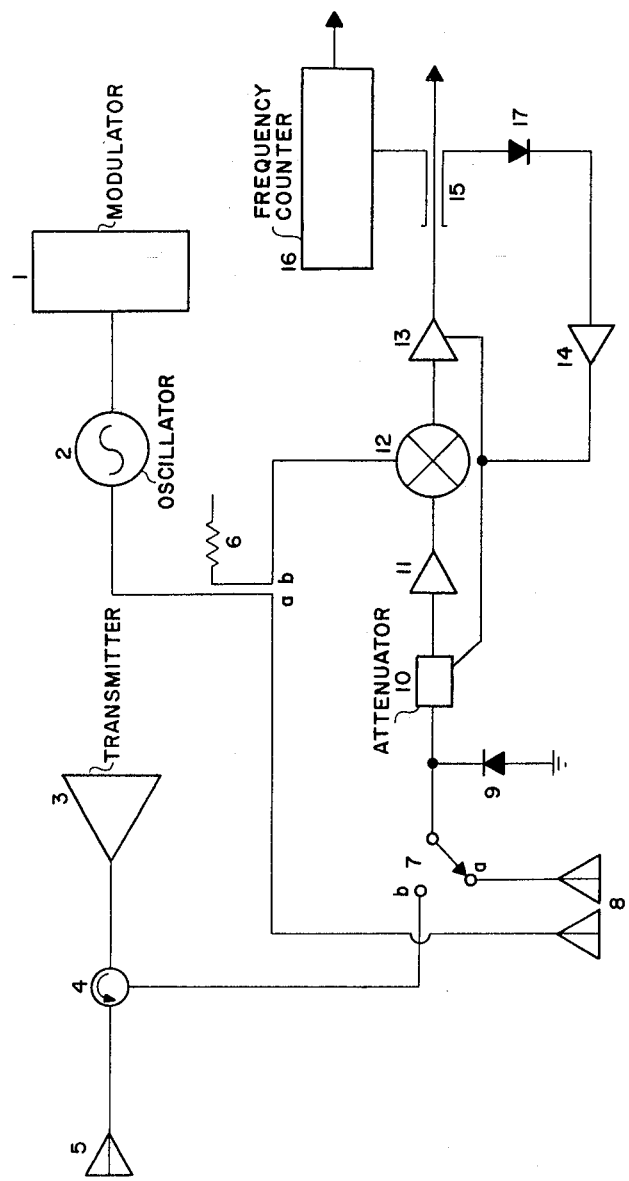

DUAL MODE RADAR SYSTEM

BACKGROUND OF THE INVENTION

The present invention relates to the field of airborne radar systems and more specifically to the radar systems included in many airborne vehicles or delivery packages.

In previous systems a plurality of radar sets are used in each vehicle. The sets are complete in themselves and are designed to perform different functions, such as altitude measuring and target tracking. As a result, the individual components of one set are often duplicated in the other sets.

The radar altimeter can be implemented in a variety of ways and can utilize nearly any radar wavelength. FM altimeters were among the first to achieve practical application and still are the primary types in low altitude applications. The first models employed triangular modulation produced by various mechanical means. Regardless of the modulation format desired, there are still fundamental items which are required for any radar altimeter. These are a modulator, which is picked to deliver the desired modulation format, transmitter, receiver, antenna and an altitude counter.

Most radar systems require the same basic subsystems; a transmitter, receiver, antenna, and data processor. Many radar systems of more recent design employ a voltage tunable local oscillator as a part of the receiver. This is especially important if the radar is a type other than fixed frequency. For example, so called frequency agile and frequency domain pulse compression systems both employ a fast tuning local oscillator.

BRIEF DESCRIPTION OF THE DRAWING

The FIGURE is a schematic diagram, partially in block form, of the preferred embodiment of the present invention.

DESCRIPTION OF THE PREFERRED EMBODIMENT

The FIGURE shows the preferred embodiment of the present invention which includes both altimeter radar, and second radar, sets. The altimeter radar is made up of modulator 1, oscillator 2, couplers 6 for splitting off a portion of the output of oscillator 2, antennas 8, and the radio frequency (RF) preamplifier. The RF preamplifier includes limiting diode 9, attenuator 10, mixer 12 for combining the return signal with a portion of the transmitter signal, amplifiers 11 and 13, detector 17, servo-loop 14, coupler 15 for taking a sample of the combined signal output, and frequency counter 16 which determines altitude from the frequency output of mixer 12.

The second radar set, such as a seeker radar, includes transmitter 3, circulator 4, antenna 5, and the RF preamplifier discussed above.

Switch 7 can be positioned to couple either the receiving antenna of the altimeter radar, or the transmitter, circulator, and antenna of the second radar, to the RF preamplifier. Switch 7 may be operated manually to permit the operator to select the mode of operation of the system, or it may be operated automatically in a time sharing sequence of any desired proportions. That is, if the swtich is automatically controlled, more time may be allotted to the second or seeker radar mode of operation than to the altimeter mode, or vice-versa. Additionally, if automatic control is utilized, a manual override control may be included to permit the operator to override the automatic control and manually select the mode of operation or mode sequencing.

All the elements of an FM radar altimeter are already present in radar systems which utilize a fast tuning local oscillator. Therefore, the combination of an altimeter and radar can be implemented as follows.

Modulator 1 programs the voltage tunable local oscillator 2 to perform a frequency deviation that is linear with respect to time. Coupler 6 directs most of the RF energy along path (a) and delivers the RF energy to the altimeter antennas 8 which are pointed down at the terrain. A short time later (determined by the distance between the terrain and the altimeter antennas) the energy returns to the altimeter antenna and is passed through switch 7. The RF preamplifier is made up of a limiter 9, a voltage controlled attenuator 10 and tunnel diode amplifier 11. A small part of the transmitted energy is directed along path (b) of coupler 6 to be mixed with the return signal in mixer 12. The difference frequency is called the I.F. and is amplified by amplifier 13. A small sample of the output power is taken by coupler 15 and detected by detector 17. Automatic gain control servo-loop 14 controls the gain of devices 10 and 13 to maintain output power at a constant level. Another sample of the output is taken by coupler 15 and delivered to the frequency counter 16 which determined altitude. As the distance between the altimeter antennas and the terrain increases, the time delay between transmit and receive increases also. Therefore, the mixer 12 output frequency increases by an amount proportional to the slope of the frequency deviation of the local oscillator. Thus, a direct readout of altitude is simply proportional to the frequency output of mixer 12.

For normal radar operation switch 7 is put in position (b). Transmitter 3 delivers energy through circulator 4 to switch 7. From the switch the energy passes through the receiver made up of components 9, 10, 11, 12, and 13. The signal is down-converted by mixer 12 and the I.F. output is then available for signal processing.

If both a radar altimeter and a search or tracking radar exist in the same vehicle there are then two independent radar systems performing a function which could be done just as well by one system. By using a common local oscillator and RF receiver for both functions, many components are eliminated. The elimination of components then yields a system which must be less costly and will perform its function more reliably.

The approach described here is but one of many possible alternatives. A specific radar receiver technique has been described, however, the invention would apply to any receiver technique which employs a local oscillator and mixer. Also, other oscillator modulation waveforms beside the linear ramp described can be used, including triangular and sinusoidal waveforms.

What is claimed is:
1. A dual mode radar system, comprising:
 a platform;
 a first antenna system mounted on said platform for transmitting and receiving frequency modulated electrical signals;
 a second antenna system mounted on said platform for transmitting and receiving frequency modulated electrical signals;

electrical circuitry means for processing the frequency modulated signals received by said first antenna system and the frequency modulated signals received by said second antenna system, and providing the dual mode radar system output, including a limiter coupled to the output terminal of said switch,
an attenuator coupled to said limiter,
a modulator,
an oscillator coupled to said modulator,
a first coupler to the output of said oscillator for splitting-off a portion of the output of said oscillator,
a mixer coupled to said attenuator and said coupler for combining the output of said attenuator and the split-off portion of said oscillator output, comparing their frequencies and providing an output of their frequency difference,
a second coupler coupled to said mixer for splitting the output of said mixer into a plurality of portions,
an automatic servo-loop coupled to the first portion of said mixer output for controlling the gain of said attenuator, and
a frequency counter coupled to the second portion of said mixer output for measuring the output of said mixer and converting said frequency difference into a distance measurement; and
means coupled to said first and said second antenna systems, and to said processing means, for alternately and mutually exclusively coupling said first antenna system to said processing means and said second antenna system to said processing means.

* * * * *